March 12, 1963 H. O. SELTSAM 3,081,063
VALVE INCLUDING A SEAT CUP
Filed June 15, 1959 2 Sheets-Sheet 1

INVENTOR.
HAROLD O. SELTSAM
BY
ATTORNEYS

March 12, 1963 H. O. SELTSAM 3,081,063
VALVE INCLUDING A SEAT CUP
Filed June 15, 1959 2 Sheets-Sheet 2
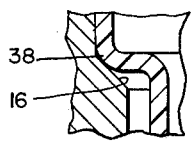
Fig.4
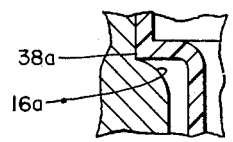
Fig.5
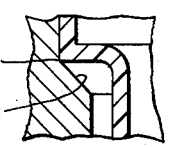
Fig.6
Fig.7
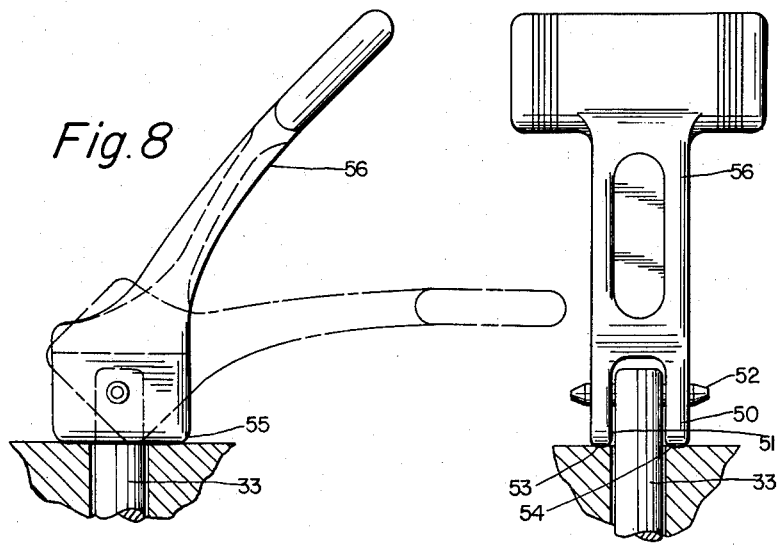
Fig.8
Fig.9
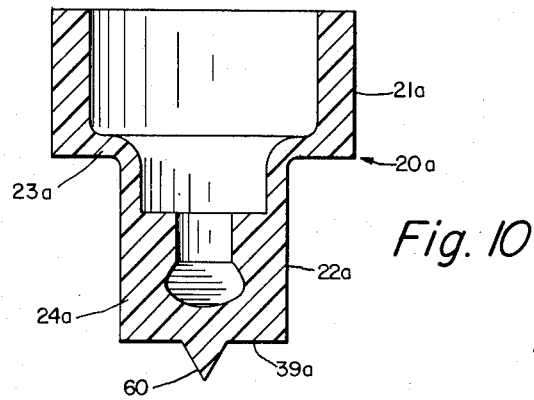
Fig.10
INVENTOR.
HAROLD O. SELTSAM
BY
*Jay & Jay*
ATTORNEYS

United States Patent Office 3,081,063
Patented Mar. 12, 1963

3,081,063
VALVE INCLUDING A SEAT CUP
Harold O. Seltsam, Rocky River, Ohio, assignor to Tomlinson Industries, Inc., Cleveland, Ohio, a corporation of Ohio
Filed June 15, 1959, Ser. No. 820,504
3 Claims. (Cl. 251—331)

This invention relates to a valve including resilient sealing means or seat cups. Seat cups of the type to which this invention generally relates are mounted midway between the ends of the fluid passageway provided in the valve body in opposed relationship to a seat formed in the body and surrounding a portion of the fluid passageway. The seat cup, so named because it is of generally cup-like configuration, includes a base and a nipple extending therefrom toward the seat. A reciprocable plunger aligned with the portion of the passageway surrounded by the seat receives the seat cup over an end thereof and by means of the reciprocable plunger, a transverse end wall provided on the nipple may be moved into and out of sealing engagement with the seat. As the nipple is moved away from the seat, a portion thereof is retracted into the base portion of the seat cup by a rolling action. The retraction of the nipple into the base portion of the cup does not increase the peripheral extent of the base portion by any appreciable amount, thereby making it possible to make a smaller, more efficient valve body.

Prior to this time, it has been found that over extended periods of use the continual retractions of the nipple into the base portion have had a tendency to cause the seat cup to wear out at a relatively fast rate. I have found that seat cups of my novel design have far outstripped the hitherto known seat cups in wear-resisting ability.

One object of this invention is to provide a valve including a seat cup of novel design for sealing off the flow of liquids through the valve member.

Another object of this invention is to provide a valve including a seat cup of the type provided with a retractable nipple, which includes means to increase the wear-resistance of the same.

A further object of this invention is to provide a valve including a seat cup of the type described in which the retractable nipple is provided with reinforcing means to aid in maintaining the nipple end in its proper shape over extended periods of use.

Still another object of this invention is to provide a valve including a seat cup which is readily attachable and detachable from its reciprocating operating plunger.

A still further object of this invention is to provide a valve including a seat cup of the retractable nipple type in which the said nipple is truly retractable, i.e., retractable in the sense that it may be telescoped into the base portion.

Yet another object of this invention is to provide a valve including a seat cup which includes means for increasing the seal between the base portion thereof and the valve housing during the time the nipple is retracted from the valve seat.

Other objects and advantages of this invention will be apparent from the detailed description to follow.

In the drawings:

FIG. 4 is a fragmentary view in longitudinal section showing the seating arrangement between the base portion of the seat cup and the housing and in which the seating portion of the housing is conical and that of the base portion is arcuate;

FIG. 5 is a fragmentary view in longitudinal section of a modified seating arrangement in which the housing is provided with convex seating portion and the base with a generally right angular seating portion;

FIG. 6 is a fragmentary view in longitudinal section in which the seating portion of the housing is concave and the seating portion of the base is genearlly right angular;

FIG. 7 is a fragmentary view in longitudinal section of still another form in which the housing is provided with a conical seating portion and the base with a generally right angular seating portion;

FIG. 8 is a side view partly in section, of the operating means for the reciprocating plunger and showing in phantom the position of the operating means when the plunger is moved to retract the nipple;

FIG. 9 shows, partly in section, a front view of the operating means of FIG. 8; and FIG. 10 is a longitudinal sectional view of a modified form of the seat cup of this invention.

Figure 1:
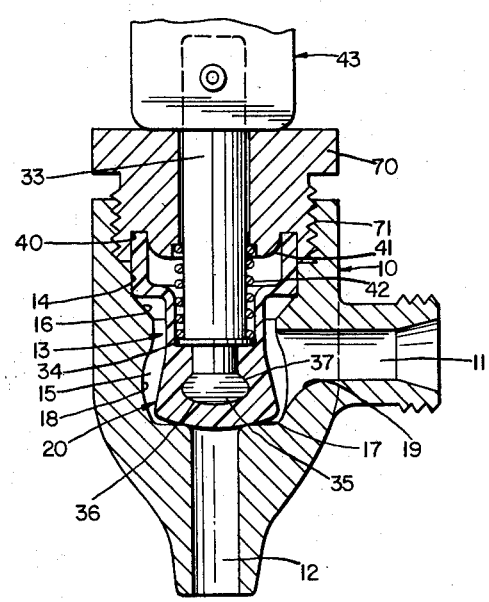
FIG. 1 is a view partly in longitudinal section of a valve employing my novel seat cup.
Figure 11:
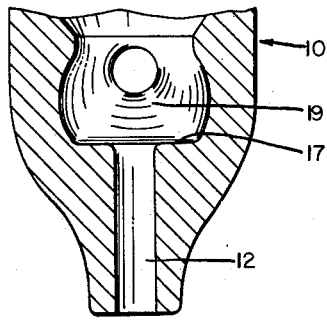
FIG. 11 is a sectional view along line 11—11 of FIG. 2 showing the manner in which the fluid passageway is flared.

Referring now more particularly to the drawings, I have shown a valve indicated generally as 10 and being formed with a fluid passageway 11, 12 therethrough. Formed intermediate the ends of the fluid passageway 11, 12 is an enlarged portion indicated generally as 13, which in this instance has been illustrated as being generally co-axial with the portion 12 of the fluid passageway. The enlarged portion 13 is of stepped configuration, having an outer portion 14 which is larger in cross-sectional dimension than inner portion 15.

The outer portion 14 and the inner portion 15 of the enlarged portion 13 are joined by an inwardly converging shoulder 16, which forms an outer sealing seat. The inner portion 15 of the enlarged portion 13 is provided with a transversely extending bottom 17 which forms an inner sealing seat. It will be observed that the side walls of the inner portion 15 of the enlargement 13 are bellied out as at 18 and that the portion 11 of the fluid passageway is smoothly curved downwardly toward the seat 17 at 19. This configuration provides a maximum amount of clearance between the walls of the housing of the valve 10 and the nipple portion of the seat cup indicated generally as 20. Screw threads or the like 71 are provided generally coaxial with the enlargement 13 for co-operation with nut 70.

The seat cup 20 is constructed from an odorless, tasteless and non-toxic resilient material having a Shore "A" hardness not greater than 60 points so that it may seal over and around imperfections which may occur in the seats 16 and 17 and over and around foreign particles which may be deposited there. The material from which the seat cup 20 is made is also resistant to hardening when surrounded by liquids of various kinds, and most especially when surrounded by coffee. I have found that a rubber-like material having a silicone content is very satisfactory for use in connection with the manufacture of these seat cups. While the Shore "A" hardness of the material from which the seat cup is constructed should not be greater than 60 points, I have found that a range from between 35 to 60 points is satisfactory with the range from 44 to 50 points being preferable. The seat cup 20 includes a tubular base portion 21, which may, if desired, be cylindrical.

Coaxial with the base portion 21 is a nipple 22 which extends from the base portion 21 towards the seat 17 when the seat cup is positioned within the valve. The nipple 22 is also tubular and may be generally circular in cross section, if desired. The diameter of the nipple 22 is reduced with respect to the diameter of the base portion 21 and the two portions are connected together by means of a transversely extending shoulder wall 23. A transversely extending wall 24 closes the free end of the nipple 22.

As may be seen from an examination of the drawings, the thickness of the transverse end wall 24 is considerably greater than the thickness of either the transverse shoulder wall 23 or the thickness of the wall of the tubular base portion 21. It may also be seen that the wall thickness of the base portion 21 is substantially greater than the thickness of the transverse shoulder wall 23.

Figure 2:
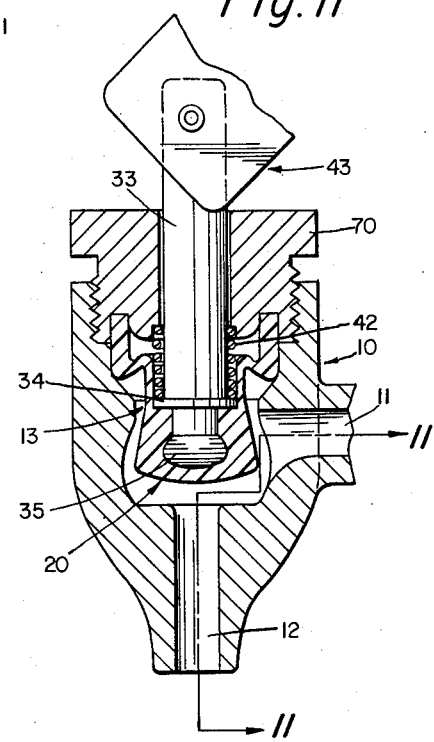
FIG. 2 is a view of a valve partly in longitudinal section employing my novel seat cup and in which the nipple is retracted into the base portion of the seat cup in order to allow flow of fluids through the valve.

The external surface of the nipple 22 is connected to the external surface of the transverse end wall 23 by a large radius fillet 25 and the internal wall of the nipple 22 and the internal surface of the transverse shoulder wall 23 are connected together by means of a large radius round 26. The fillet 25 describes an arc not less than 45° nor more than 135° and has a radius not less than 5/64" nor more than 7/64", while the round 26 describes an arc of not less than 45° nor more than 135° and has a radius not less than 9/64" nor more than 11/64". It has been found that the provision of fillets and rounds falling within the ranges listed above insures the proper flexing action of the nipple with respect to the base portion 21 to permit the same to be retracted into the base portion through a rolling action, as shown in FIG. 2, for example, without fatiguing the material excessively since the stresses are distributed over a wider area.

Provided in the end wall 24 of the nipple 22 is a bore 27 formed generally along the axis of the seat cup. The inner end of the bore 27 is provided with an enlargement or groove 28. The groove 28 is formed adjacent the bore 27 with slanting wall surfaces 29, which converge in a direction towards the base portion 21 of the seat cup. The formation of the groove 28 provides a resilient web portion 30 disposed between the slanted wall portions 29 of the groove 28 and the face 31 of the transverse end wall 24. It will be observed that the face 31 of the transverse end wall 24 and the inner surface of the nipple 22 together form a counterbore 32, generally coaxial with the axis of the seat cup and of the bore 27.

The valve is provided with a plunger member 33 which carries intermediate its ends a radially extending flange 34. The end portion of the reciprocable plunger 33 beyond the flange 34 and opposed to the portion 12 of the fluid passageway is provided with a knob-like member 35 which is provided on one face thereof with a domed cam surface 36 and on the other face thereof with slanting surfaces 37 of similar configuration to the surfaces 29 of the groove 28 formed in the seat cup.

The plunger 33 is formed with a cross-sectional dimension between the knob-like member 35 and the flange 34 which is approximately the same as the cross-sectional dimension of the bore 27 and the dimensions of the knob-like member 35 are generally the equivalent of those of the groove 28. By this arrangement, the seat cup 20 is received over the end of the piston 33 opposed to the passageway 12.

The dome-shaped cam surface 36, when pushed axially along the bore 27, will force the web 30 radially outwardly until the knob-like member 35 is positioned within the groove 28, thereby removably locking the nipple 22 of the seat cup 20 to the end of the plunger 33. If it should be desired to remove the seat cup 20 from the plunger 33, they need merely be pulled apart, at which time the slanting surfaces 37 formed on the knob-like member 35 will co-act with the slanting surfaces 29 of the groove 28 to cam the web 30 radially outwardly, thereby allowing the knob-like projection to pass out of the bore to free the seat cup from the plunger.

Figure 3:
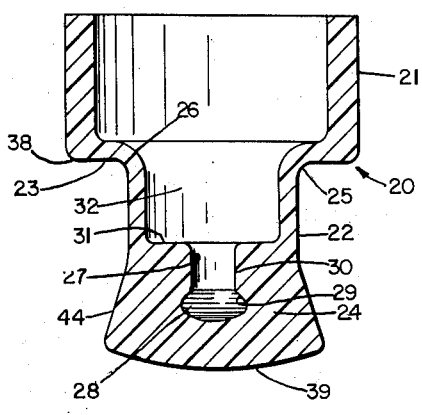
FIG. 3 is an enlarged view in longitudinal section showing the novel seat cup of this invention.

As shown in FIGS. 1 and 2, when the seat cup is positioned within the valve, the body portion 21 thereof snugly fits the outer portion 14 of the enlargement 13, with the edge 38 thereof being firmly positioned against the outer seat 16 to thereby provide a sealing action. The face 39 of the transverse end wall 24 of the seat cup 20 may be dome-shaped as shown in FIG. 3 and in the assembled position as shown in FIGS. 1 and 2 is opposed to the inner seat 17 disposed around the portion 12 of the fluid passageway. The nut member 70 is formed with an annular groove 40, which receives the free end of the base portion 21 and holds the same against appreciable axial movement with the edge 38 in snug abutment with the seat 16. One wall 41 of the groove 40 may be flared, if desired, in order to increase the ease with which the free end of the base portion 21 may be guided into the groove. A spring 42 is provided to bias the plunger and has one end portion thereof bearing against the nut 70 and the other end portion being received within the counterbore 32 of the seat cup 20 and bearing against one face of the flange 34, the other face of the flange lying closely adjacent to the face 31 of the transverse end wall 24.

As seen in FIG. 1, the plunger 33, when in an inward position under the influence of operating means 43, will hold the surface 39 of the transverse end wall 24 firmly against the inner seat 17 to prevent the flow of fluids from portion 11 of the passageway through portion 12 thereof. When, through the action of operating means 43, the plunger is moved away from the seat 17, it will carry with it the nipple portion 22, thus moving the surface 39 of the transverse end 24 away from the inner seat 17 to thereby allow fluid to pass out through portion 12 of the passageway, as shown in FIG. 2.

Because of the fact that the base portion 21 of the seat cup is maintained against axial movement by the nut member 70, a portion of the nipple 22 will be telescoped or retracted into the base portion 21 when the plunger 33 is moved away from the inner seat 17, as shown in FIG. 2. During such retractions, the transverse shoulder wall 23 will be folded or rolled into the base portion 21. The increased wall thickness of the base portion 21 reduces the tendency of the same to collapse with an accordion-like action during such time as the nipple is being retracted. It will be evident that such a collapse would tend to destroy the sealing action of the base against the upper portion 14, enlarged portion 13 and seat 16. It has been found, however, that during retraction of the nipple 22 into the base portion 21 of the seat cup a slight outward bulging of the wall of the base portion 21 will result, instead of the above-described accordion-like action. This however, is desirable in that the seal between the outer surface of the base portion and the outer portion of the enlargement 13 is increased. It has further been found that the retraction of the nipple into the base portion causes the edge 38 to be pulled inwardly and downwardly along the slanting seat 16, which results in a sliding of the edge 38 along the seat 16 to further increase the seal existing between the base portion of the seat cup and the housing of the valve 10. It will be remembered that the transverse end wall 24 of the nipple 22 has been described as being considerably greater in thickness than the remaining walls of the seat cup.

This particular arrangement possesses several advantages, among which is included a strong positive interlock between the knob-like member 35 and the groove 28. This increased wall thickness also acts as a reinforcement for the sealing end of the nipple and prevents the same from becoming misshapen after considerable use. Obviously, if this contingency were to occur, it would act as an impairment to the proper sealing action of the nipple against the inner seal face 17. As a further reinforcement the sealing end of the nipple may be flared outwardly as at 44 in the embodiment of FIGS. 1–3.

FIGS. 4 through 7 illustrate a number of different varieties of acceptable seating arrangements between the edge of the body portion of the seat cup and the outer seat 16. In FIG. 4, for example, the seat 16 is of general conical form and the edge 38 of the body portion is arcuate. In FIG. 5, the seat 16a is convex while the edge 38a is sharp, that is to say, generally right angular in longitudinal section. In FIG. 6, the seat 16b is concave in configuration, while the edge 38b is generally right angular in longitudinal section. In FIG. 6, the seat 16c is conical and the edge 38c of the body portion is again generally right angular in longitudinal section. It will be, of course, understood that various other combinations of edge and seat configurations could be employed, if desired.

FIGS. 8 and 9 illustrate one type of operating means which may be employed for the reciprocating of plunger 33. In the pictured instances, the operating means may include a pair of spaced ears 50 and 51, which are disposed on either side of the plunger 33. Both the ears and the plunger have holes formed therein for receiving a transverse pin 52, which attaches the plunger 33 to the ears 50 and 51. The edges 53 and 54 of the ears are formed with cam surfaces, as shown, for example, at 55 in FIG. 8. These cam surfaces are adapted to bear against the outer surface of the nut 22 and upon relative rotation of these surfaces and the upper face of the nut, the plunger 33 is raised or lowered. Attached to the ears 50 and 51 is a handle means 56, which is adapted to be grasped by an operator and moved to the position shown in phantom in FIG. 8 to thereby raise the plunger 33 and retract the nipple of the seat cup into the base portion thereof.

In FIG. 10 I have shown another embodiment which the seat cup of this invention may take. This embodiment, similarly to that of FIGS. 1 to 3, includes a base portion 21a, a nipple portion 22a, a transverse shoulder wall 23a and a transverse end wall 24a. In this instance, however, the face 39a of the transverse end wall 34a is substantially flat and extends at substantially right angles to the axis of the seat cup. Formed centrally of the face 39a is a generally conical tip 60 which is adapted to extend into the portion 12 of the valve of the fluid passageway when the face 39a is in sealing engagement with the seat 17. This nipple acts as a collecting means for slight amounts of liquid remaining in the valve after the same has been closed. The tip 60 increases the ease with which drops are formed and thereby allows the valve to drain in a minimum amount of time after it has been sealed off by means of the nipple 22a.

It may be seen that I have provided by my novel seat cup a sealing means for valves which is markedly superior in structure and function. It has been found that the provision of the fillets and rounds at the point of junction between the nipple walls and the shoulder wall has had a startling effect on the wear resisting properties of the seat cup. This is apparently due to the fact that these fillets and rounds increase the ease with which the nipple may be retracted into the base, thereby reducing stress concentrations and the like within the seat cup at the juncture point. Seat cups which provide only small radius rounds and fillets or which do not provide any rounds or fillets at all have been found to be markedly inferior in wear resisting qualities than seat cups employing large radius rounds and fillets as included in my invention.

It may also be seen that by means of my invention I have provided a seat cup which will effectively seal over and around imperfections in the valve sealing seats and which includes means to increase the sealing action of the base portion thereof with the housing at such times as the nipple portion is retracted into the base.

While I have shown my invention as being included in certain illustrated embodiments for the purpose of simplicity of description, it will be realized that a number of departures can be made from the illustrated embodiments without at the same time departing from the true spirit and scope of the invention. It is therefore my desire to be limited only by the spirit and scope of the appended claims.

I claim:
1. A valve for controlling fluid flow and including a valve body having inlet and outlet ports, a fluid passageway in the valve body interconnecting said ports, an enlarged portion intermediate the ends of the passageway forming a seal chamber, a generally flat sealing seat defined by the enlarged portion, said seat extending transversely of the passageway and completely surrounding the same, a plunger in the seal chamber generally aligned with the sealing seat and having one end opposed to such seat, means to reciprocate said plunger toward and away from said sealing seat, resilient sealing means disposed in the seal chamber and received over said one end of the plunger, said resilient sealing means being comprised of rubberlike material having a Shore "A" hardness of from about 35 to about 60 points and including an elongated generally cylindrical tubular base portion remote from said sealing seat and aligned therewith, an elongated generally cylindrical tubular nipple portion of smaller diameter than the base portion, said nipple portion being generally coaxial with the base portion and extending therefrom toward the sealing seat, a transversely extending shoulder portion joining the nipple portion to the base portion, said shoulder portion, in the free state thereof, lying substantially in a plane generally perpendicular to the mutual axis of the nipple and base portions one end surface of the base portion being substantially coplanar with one surface of said shoulder, said nipple portion at its free end having a transverse end wall closing the same, said transverse end wall having a thickness substantially greater in magnitude than the wall thickness of the remaining parts of the fluid sealing means, said transverse end wall further having a diameter greater in magnitude than any dimensions of the passageway in the plane of the sealing seat, both said nipple portion and said base portion opening in a direction away from the sealing seat, means to attach said nipple portion to said plunger for reciprocation therewith, and including a recess formed in the internal surface of the transverse end wall and a knob formed on said one end of the plunger of conformation corresponding to that of said recess, said knob being removably snap-fitted into said recess, means to maintain said base portion against substantial axial and lateral movement within said seal chamber, spring means normally biasing the plunger toward the sealing seat, said spring means being received around the plunger and being positioned within the tubular base and tubular nipple portions, said base portion, nipple portion, transverse shoulder portion and transverse end wall being imperforate so as to prevent direct communication of fluid with the plunger and the spring biasing means therefor, said transverse end wall in one position of the plunger sealingly engaging said sealing seat, and in another position of said plunger said nipple being partially telescopically retracted within the base portion to permit fluid flow through said valve, the junction between the external surface of said nipple and of said transversely extending shoulder is filleted on a radius of from about 3/64 inch to about 7/64 inch and transcribing an arc of about 45 degrees to about 135 degrees, and further in which the junction between the internal surface of said nipple and said transversely extending shoulder is rounded on a radius of from about 9/64 inch to 11/64 inch and transcribing an arc of from about 45 degrees to about 135 degrees.

2. A valve as defined in claim 1 in which the wall thickness of the base portion is materially greater than that of the remainder of the fluid sealing means with the exception of the transverse end wall of the nipple portion.

3. A valve as defined in claim 1 in which the means to maintain the base portion against substantial axial and lateral movement includes an annular wall forming member received within and laterally supporting the free end of the tubular base portion.

(References on following page)

References Cited in the file of this patent

UNITED STATES PATENTS

| Number | Name | Date |
|---|---|---|
| 49,527 | Jenkins | Aug. 22, 1865 |
| 243,118 | Garsed | June 21, 1881 |
| 2,360,603 | Ward | Oct. 17, 1944 |
| 2,603,445 | Marchant | July 15, 1952 |
| 2,715,418 | Van Derbeck | Aug. 16, 1955 |
| 2,755,672 | Delany | July 24, 1956 |
| 2,951,503 | Windsor | Sept. 6, 1960 |

FOREIGN PATENTS

| Number | Country | Date |
|---|---|---|
| 10,404 | Great Britain | of 1902 |
| 455,723 | Italy | of 1950 |
| 528,540 | Canada | of 1956 |
| 1,044,910 | France | of 1953 |